(12) United States Patent
Schauder et al.

(10) Patent No.: US 8,349,949 B2
(45) Date of Patent: Jan. 8, 2013

(54) MODIFIERS FOR THERMOPLASTIC ALLOYS AND ALLOYS PRODUCED USING SUCH MODIFIERS

(75) Inventors: Jean-Roch Schauder, Wavre (BE); Guy Joseph Wouters, Brussels (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 373 days.

(21) Appl. No.: 11/579,567

(22) PCT Filed: May 18, 2005

(86) PCT No.: PCT/EP2005/005490
§ 371 (c)(1),
(2), (4) Date: Nov. 6, 2006

(87) PCT Pub. No.: WO2005/111143
PCT Pub. Date: Nov. 24, 2005

(65) Prior Publication Data
US 2007/0270528 A1 Nov. 22, 2007

(30) Foreign Application Priority Data
May 19, 2004 (GB) .................................. 0411119.1

(51) Int. Cl.
C08L 23/08 (2006.01)
C08L 51/06 (2006.01)
C08K 3/02 (2006.01)

(52) U.S. Cl. ................. 525/78; 525/66; 525/70; 525/79; 525/242; 525/244; 525/262; 524/80; 524/504

(58) Field of Classification Search ............... 525/66, 525/70, 79, 78, 242, 244, 262; 524/80, 504
See application file for complete search history.

(56) References Cited

U.S. PATENT DOCUMENTS

| | | | |
|---|---|---|---|
| 3,326,917 A | 6/1967 | Freimiller et al. | |
| 3,362,944 A * | 1/1968 | Eichenbaum et al. | 526/159 |
| 4,311,628 A | 1/1982 | Abdou-Sabet et al. | |
| 4,762,882 A | 8/1988 | Okano et al. | 525/74 |
| 4,950,541 A | 8/1990 | Tabor et al. | |
| 5,017,714 A | 5/1991 | Welborn, Jr. | |
| 5,055,438 A | 10/1991 | Canich | |
| 5,096,867 A | 3/1992 | Canich | |
| 5,153,157 A | 10/1992 | Hlatky et al. | |
| 5,194,509 A | 3/1993 | Hasenbein et al. | |
| 5,198,401 A | 3/1993 | Turner et al. | |
| 5,240,894 A | 8/1993 | Burkhardt et al. | |
| 5,264,405 A | 11/1993 | Canich | |
| 5,268,134 A * | 12/1993 | Burlett et al. | 264/209.6 |
| 5,324,800 A | 6/1994 | Welborn, Jr. et al. | |
| 5,346,963 A * | 9/1994 | Hughes et al. | 525/285 |
| 5,507,475 A | 4/1996 | Seel et al. | |
| 5,525,668 A | 6/1996 | Olivier | 524/504 |
| 5,622,780 A * | 4/1997 | Paleari | 428/328 |
| 5,705,565 A * | 1/1998 | Hughes et al. | 525/65 |
| 5,783,629 A * | 7/1998 | Srinivasan et al. | 525/63 |
| 6,235,837 B1 * | 5/2001 | Basset et al. | 525/66 |
| 6,331,592 B1 * | 12/2001 | Wong | 525/71 |
| 6,403,772 B1 * | 6/2002 | Ewen et al. | 556/9 |
| 6,538,066 B2 | 3/2003 | Watanabe et al. | 525/184 |
| 6,545,091 B1 * | 4/2003 | Lee et al. | 525/78 |
| 2003/0236363 A1 * | 12/2003 | Ravishankar | 526/65 |
| 2004/0033741 A1 * | 2/2004 | Peng | 442/38 |
| 2004/0077791 A1 * | 4/2004 | Issum et al. | 525/185 |

FOREIGN PATENT DOCUMENTS

| | | |
|---|---|---|
| CA | 1 268 753 | 5/1990 |
| EP | 0 227 004 | 1/1988 |
| EP | 0 277 003 | 8/1988 |
| EP | 0 129 368 | 7/1989 |
| EP | 0 520 732 | 12/1995 |
| EP | 0 878 510 | 11/1998 |
| EP | 0 946 642 | 10/1999 |
| EP | 1 522 555 | 4/2005 |
| JP | 63-041554 | 2/1988 |
| JP | 200290441 | 10/2000 |
| WO | WO 91/13119 | 9/1991 |
| WO | WO 92/00333 | 1/1992 |
| WO | WO 93/03093 | 2/1993 |
| WO | WO 94/03506 | 2/1994 |
| WO | WO 99/24483 | 5/1999 |

OTHER PUBLICATIONS

The Ethylene-Propylene Rubbers pdf from the Website www.iisrp.com/WebPolymers/10EPDMSep11.pdf (2002).*
Ethylene-Propylene Rubbers pdf from the site www.iisrp.com/WebPolymers/10EPDMSep11.pdf, 2002.*
Full English Translation of JP 63-041554.*

* cited by examiner

*Primary Examiner* — Mark Kaucher
(74) *Attorney, Agent, or Firm* — Stephen Timmins; Kevin M. Faulkner; Leandro Arechederra

(57) ABSTRACT

Non cross-linked modifiers for thermoplastic alloys comprising from 20 to 80% by weight based on the modifier of an interpolymer of ethylene and an alpha-olefin having from 4 to 12 carbon atoms grafted with an acid functionality, preferably maleic anhydride, having a Melt Index of from 0.3 to 100 and a density of 0.85 to 0.91 prior to being grafted and from 80 to 20% by weight of an ungrafted diene containing interpolymer derived from ethylene and an alpha-olefin having from 3 to 12 carbon atoms and an amount of a cross-linking component effective to provide cross-linking during subsequent melt blending with a condensation polymer having a melting point of at least 150° C.

15 Claims, No Drawings

MODIFIERS FOR THERMOPLASTIC ALLOYS AND ALLOYS PRODUCED USING SUCH MODIFIERS

CROSS REFERENCE TO RELATED APPLICATIONS

This application is a 371 National Stage Application of International Application No. PCT/EP2005/005490, filed May 18, 2005, which claims the benefit of GB 0411119.1, filed May 19, 2004, the disclosures of which are herein incorporated by reference in their entireties.

FIELD OF THE INVENTION

The invention relates to modifiers for thermoplastic alloys and especially but not exclusively soft polyamide alloys for use especially, but not exclusively, in automotive applications. The alloys may be polyamide alloys. The alloys provide an improved balance of softness, resilience and high service temperature. The invention also relates to processes and alloys using the modifiers.

BACKGROUND OF THE INVENTION

The procedure for Example 1 in U.S. Pat. No. 5,525,668 DSM Copolymer Inc. uses an MAH grafted EP elastomer in combination with a ungrafted EP elastomer as an impact modifier in a polyamide blend prepared in a two-step process. The components are first blended in a Brabender mixer to initiate melting and secondly the curatives are added to vulcanize the elastomer. The compounding occurs in a batch reactor and requires a second mixing step for homogenization and a total residence time of 10-12 minutes. In example 5 the EP elastomer backbone prior to grafting contained 55 mol % of ethylene derived units and had a molecular weight as reflected in a Mooney viscosity (1+4) at 257° F. of 20 after grafting the polymer contained 1.7 wt % MAH. The options for the ungrafted EP elastomer included an EP-ENB terpolymer having a 65:35 molar ratio of ethylene to propylene and 8.5 wt % ENB and had a RSV of 2.3 in decalin. Another option was an ungrafted EP elastomer also included an EP copolymer having an RSV of 2.8 containing 55 mole % ethylene. Table V shows combination using 30 parts by weight of polyamide. The two step blending approach risks consumption of the curatives prior to their dispersion in the blend and the cross-linking action of the elastomer.

EP946642 describes the production of a flexible polyamide blend not relying on cross-linking. Certain viscosity limits are observed for the polymeric components to ensure dispersion of the majority rubber composition in a polyamide matrix. Thus the use of this technique limits the range of blends that can be made and properties that can be obtained.

U.S. Pat. No. 6,538,066 The Yokohama Rubber Co. Ltd discloses a thermoplastic elastomer composition obtained by blending a polyamide with brominated isobutylene-p-methyl styrene copolymer.

It is among the objects of the invention to provide modifiers for preparing improved thermoplastic alloys and especially polyamide alloys, which can be employed in a single step, dynamic vulcanization process, that may incorporate high levels of elastomer modifier while still providing a continuous matrix of a polyamide or other condensation polymers having functional groups. It is further among the objects of the invention to provide improved alloys with an improved balance of end use properties and in particular flexural modulus, tensile strength and oil aging suitable for example for automotive under the hood applications.

U.S. Pat. No. 5,783,629 describes a composition of a polyolefin which may be a polypropylene, an EPDM having a Mooney of from 10 to 120 and an amorphous low molecular weight polyolefin having a molecular weight of from 1000 to 15000 which may be an ethylene copolymer or a block copolymer. The composition does not contain a cross-linking component effective to provide cross-linking during subsequent melt blending.

JP200290441 describes a composition from a maleated EPDM, an ethylene- alpha-olefin copolymer and nylon. The composition does not include a non-maleated EPDM or a maleated interpolymer of ethylene and an alpha-olefin having from 4 to 12 carbon atoms.

SUMMARY OF THE INVENTION

The invention firstly provides a non cross-linked modifier for a thermoplastic alloy comprising from 20 to 80% by weight based on the modifier of an interpolymer of ethylene and an alpha-olefin having from 4 to 12 carbon atoms grafted with an acid functionality, preferably maleic anhydride, having a Melt Index of from 0.3 to 100 and a density of 0.85 to 0.91 prior to being grafted and from 80 to 20% by weight of an ungrafted diene containing interpolymer derived from ethylene and an alpha-olefin having from 3 to 12 carbon atoms and an amount of a cross-linking component effective to provide cross-linking during subsequent melt blending with a condensation polymer having a melting point of at least 150° C. Higher grafting levels may be obtained with lower incidence of gels.

The polymer modified is preferably a condensation polymer such as polyamide or polyester. Preferably the modifier itself does not contain a condensation polymer.

Suitably the modifier is in a particulate form for blending with particulate polymer to be modified and is preferably in pelletized form. The condensation polymer has functional groups resulting from the condensation polymerization reaction.

Improved performance can be obtained by the combined use of more than 50 wt % of the impact modifier and copolymers derived from ethylene and higher alpha-olefin comonomers (such as 1-butene, 1-hexene, 4-methyl 1-pentene and 1-octene) as feedstock for the grafted interpolymer. The composition can be conveniently prepared by a combined blending and curing step involving phase inversion. The grafted ethylene interpolymer may contain from 0.1 to 4 wt % of MAH.

Suitably the grafted interpolymer has a Melt Index of at least 0.3 and/or less than 50 and/or a density of at least 0.85, preferably at least 0.86 and/or less than 0.89, preferably less than 0.88 prior to being grafted. The flexural modulus of the overall composition is preferably at least 150 MPa and/or less than 500 MPa. Preferably the grafted ethylene interpolymer is obtainable from a process using metallocene based catalyst such as a monocyclopentadienyl and biscyclopentadienyl derivative accompanied by a suitable activator such a methyl alumoxane or a non-coordinating, stabilizing anion generator.

The grafted ethylene interpolymer may be present in an amount of at least 30 wt %, preferably at least 40 wt % up to 95 wt %, preferably up to 90 wt %, relative to the ungrafted EPDM.

Suitably the ungrafted diene containing interpolymer has a content of ethylene derived units as determined by NMR of at least from 40 wt %, preferably at least 50 wt %, up to 85 wt %, preferably up to 80 wt %.

The ungrafted diene containing interpolymer may be derived from ENB and/or VNB and preferably has a molecular weight expressed as a Mooney viscosity [ML(1+4) 125° C.] of from 10 to 100 or from 10 to 300 if in oil extended form and/or is preferably an ethylene propylene vinyl norbornene interpolymer and/or an ethylene propylene ethylidene norbornene vinyl norbornene interpolymer containing from 0.1 to 3 wt % of VNB derived units. All references to Mooney viscosity use the condition [ML(1+4), 125° C.] ™ measured in accordance with ASTM-1646 using a large rotor unless other wise mentioned. As appropriate processing oil may be used. Conveniently the modifier contains at least 10 wt % and/or less than 50 wt % of an extender oil.

The modifier may further contain a cross-linking component. This permits the direct use of the modifier in preparing modifier-rich alloys using phase inversion techniques. The cross-linking component may comprise a peroxide, optionally used in conjunction with a co-agent. The cross-linking component may also comprises a phenolic resin.

While the modifier may be in pelletized form and contain the interpolymers and peroxide in admixture for use in a subsequent step of blending with the condensation polymer, other sequences of combinations of the ingredients may also be practiced. The peroxide may be part of a pelletized, pre-blended masterbatch with at least part of the interpolymers and the balance of the interpolymers may be present physically separate, pelletized form, to form a dry blend with the masterbatch. The pelletized components or the dry-blend may next be dry-blended with the condensation polymer. Also the interpolymers may be pre-blended and pelletized, and the peroxide may be present in physically separate form to as such or incorporated into masterbatch pellets. Again dry-blending with these components can be combined to form a modifier of the invention and can be dry-blended with the condensation polymer subsequently.

In a further aspect of the invention there is provided the use of a pelletized, homogeneous non cross-linked modifier having any one or more of the features described above in the preparation of a blend with condensation polymer, in which the condensation polymer forms the matrix component, by melt blending the total blend at a temperature above that at which the curative action of the cross-linking component is triggered. At sufficiently high levels of the modifier, generally above 50 wt % of the modifier, the curing leads to an increasing coherence of the impact modifier so that it forms the dispersed phase in a matrix formed by the condensation polymer and an overall soft alloy.

Thus the invention also provides a process for making a thermoplastic alloy using a modifier which comprises the steps of:

A) melt blending the modifier with up to 50% by weight based on the total content of polymeric components in the alloy of a condensation polymer having polar groups under conditions such that the curative action of the cross-linking component is triggered and a phase inversion occurs in which the condensation polymer becomes the matrix component; and B) recovering the resulting thermoplastic alloy.

The invention further provides a thermoplastic alloy comprising:

a) from 20 to 60 wt % of the total polymer weight of polymer of a condensation polymer having polar groups; and b) up to 80 wt % of a crosslinked dispersed elastomeric modifier comprising from 20 to 80% by weight based on the modifier of a interpolymer grafted with acid functionality, preferably maleic anhydride, of ethylene and an alpha-olefin having from 4 to 12 carbon atoms having a Melt Index of from 0.3 to 100 and a density of 0.85 to 0.91 prior to being grafted and from 80 to 20% by weight of an ungrafted diene containing interpolymer derived from ethylene and an alpha-olefin having from 3 to 12 carbon atoms;

said composition having a flexural modulus of from 100 MPa to 700 MPa. The alloy is preferably, but not exclusively, producible by the foregoing process.

The flexural modulus is suitably from at least 150 MPa and/or less than 500 MPa. The alloy may have a tensile strength corresponding to the equation A/B>35 MPa, where A is the tensile strength at break and B is the fraction by weight of the condensation polymer relative to the total polymer weight in the composition. The alloy may be crosslinked sufficiently to provide a weight increase after oil aging at 100° C. of less than 25%.

The condensation polymer may be a polyamide having polar amide groups and is preferably nylon 6.

Other optional features for the modifier mentioned previously may also be present in the alloy.

The condensation polymer may contain at least 50 wt % based on the weight of the condensation polymer of a filler, such as glass beads or glass fibers as well as other mineral fillers and combinations thereof.

Further improved performance can be obtained by appropriate selection of the three polymer components aforementioned, their relative proportions and the conditions under which the components are blended and cross-linked.

The ratio of modifier/condensation polymer is preferably from 80/20 to 50/50. The ratio of grafted ethylene copolymer/ungrafted diene interpolymer is preferably from 75/25 to 25/75. The ratio of the modifier/peroxide cure agent may be from 400/1 to 20/1. The ratio of grafting agent (maleic anhydride)/ethylene interpolymer may be from 0.04 to 0.01. All ratios are by weight. Where phenolic resins are used as a curing agents, they are preferably used in amounts from 1 to 10 percents specially 1 to 5 and are used in combination with stannyl chloride at levels from 0.5 to 5%. The phenolic cross-linking agent is a low molecular weight polymer which, when present has to be considered as part of the total polymer content of the composition.

DETAILS OF THE INVENTION

The ethylene alpha-olefin interpolymer with the alpha olefin from 4 to 12 carbon atoms to be grafted are known as plastomers or VLDPE (very low density polyethylene). They are sold under the Tradename EXACT™ by ExxonMobil and also available from Dow Chemical Company as AFFINITY™ or DuPont-Dow as Engage™. Further suitable polymers are available as STAMILEX™ from DSM and as TAFMER™ from Mitsui Chemical Co.

Suitable ungrafted diene interpolymers are ethylene propylene diene terpolymers made by DuPont Dow as Nordel™ IP, by DSM as Keltan™, by Bayer as Buna™ and by Exxon-Mobil as Vistalon. The ethylene content may range from 40 wt % to 80 wt %. The diene content may generally range from 1 wt % to 12 wt %. Possible dienes for improving the curing process may include diene having one groups capable of olefinic polymerization such as, 1,4-hexadiene, 1,1 dimethyl 5-hexadiene, ethylidene norbornene, and dienes having two groups capable of olefinic polymerization such as norbomadiene, dicyclopentadiene, vinylidene norbornene, and divinyl benzene as well as substituted versions thereof with ethylidene norbornene and vinylidene norbornene preferred.

The diene containing interpolymer as well as the modifier made from it may contain non-volatile liquids such as mineral oils or poly-alpha-olefins such as those sold by ExxonMobil under the tradename SpectraSyn™ at levels going from 10 phr to 100 phr. With non-volatile is meant that the flash point is above 150° C.

The cross-linking may be effected by conventional peroxide such as Lupersol 101. Examples of peroxides include mainly dialkyl peroxides having a high decomposition temperature (2,5-dimethyl-2,5-di(tert-butylperoxy)-hexane, 2,5-dimethyl-2,5-di(tert-butylperoxy)-hexyne-(3), tert-butyl cumyl peroxide, di(2-tert-butylperoxypropyl-(2))-benzene, dicumyl peroxide, di-tert-butyl peroxide, di-tert-amyl peroxide), hydroperoxides but also high decomposition temperature peroxyketals (ethyl 3,3-di (tert-butylperoxy) butyrate, ethyl 3,3-di (tert-amyllperoxy) butyrate, n-Butyl 4,4-di-(tert-butylperoxy) valerate, 2,2-di (tert-butylperoxy) butane or peroxyesters 00-tert-butyl-0-isopropyl-monoperoxycarbonate, 00-tert-butyl-0-(2-ethylhexyl)1-monoperoxycarbonate and others.

When polyamides are used as the condensation polymer, all polyamides have the requisite amide functionality capable of reacting with the maleated impact modifier component. These include PA-6, PA-6,6, PA-11, PA12, PA-4,6, other copolymers, polyphtalamide and other high temperature polyamides. The melting point of these polyamides may vary from 150° C. to 370° C., preferably from 170° C. to 300° C. The polyamides may have a molecular weight indicated by a melt viscosity of from 300 to 10000 Pa.sec, preferably 500 to 7000 Pa.sec.

The grafted ethylene interpolymers may be obtained by grafting an ethylene interpolymer copolymer of ethylene and an α-olefin, preferably a $C_4$ to $C_{40}$ α-olefin, even more preferably a $C_4$ to $C_{18}$ α-olefin, even more preferably a $C_4$ to a $C_{12}$ α-olefin. In a preferred embodiment the ethylene polymer has a molecular weight distribution (Mw/Mn) of 3.5 or less, preferably 3 or less, even more preferably 2 or less. In another preferred embodiment the ethylene copolymer has a Composition Distribution Breadth Index (CDBI) of 50% or more, preferably 60% or more, even more preferably 70% or more, even more preferably 80% or more. CDBI is a measure of the uniformity of comonomer distribution within a given sample and is measured according to the method described in PCT publication WO 93-03093, published Feb. 18, 1993, including that fractions having a molecular weight less than 15,000 Mw (weight average molecular weight) are disregarded.

The ethylene interpolymer may have a Melt Index of 50 g/10 min or less, preferably 20 g/10 min or less, more preferably 10 g/10 min or less. The ethylene interpolymer may have a density between 0.85 and 0.90, more preferably between 0.86 and 0.89, even more preferably between 0.865 and 0.88. The MI is measured according to ASTM-1238 Condition E.

Ethylene interpolymers having narrow Mw/Mn and high CDBI's which are most useful in this invention can be produced by the methods described in U.S. Pat. No. 5,055,438; U.S. Pat. No. 5,507,475; U.S. Pat. No. 5,096,867; U.S. Pat. No. 5,264,405; U.S. Pat. No. 5,324,800; U.S. Pat. No. 5,017, 714; U.S. Pat. No. 5,240,894; U.S. Pat. No. 5,198,401; U.S. Pat. No. 5,153,157; WO 92 00333; WO 94 03506; EPA 520, 732; EPA 129,368; EPA 277,003; EPA 277,004; and CA 1,268,753, which are incorporated by reference herein for US purposes. These polymers can be modified to contain the unsaturated acid or anhydride group by methods known in the art, such as U.S. Pat. Nos. 3,326,917, 4,950,541 and 5,194, 509, which are incorporated by reference herein for US purposes.

The grafted ethylene interpolymer has an acid functionality such as unsaturated acid or anhydride moiety. Preferred unsaturated acids or anhydrides include any unsaturated organic compound containing at least one double bond and at least one carbonyl group (—C=O). Representative acids include carboxylic acids, anhydrides, esters and their salts, both metallic and non-metallic. Preferably the organic compound contains an ethylenic unsaturation conjugated with a carbonyl group. Examples include maleic, fumaric, acrylic, methacrylic, itaconic, crotonic, α-methyl crotonic, and cinnamic acids as well as their anhydrides, esters and salt derivatives. Maleic anhydride is particularly preferred. The unsaturated acid or anhydride is preferably present at about 0.1 weight % to about 10 weight %, preferably at about 0.5 weight % to about 7 weight %, even more preferably at about 1 to about 4 weight %, based upon the weight of the ethylene copolymer and the unsaturated acid or anhydride.

Functionalization is performed preferably in a continuous extruder reactor either counter rotating non intermeshing or co-rotating intermeshing operating at a temperature of from 170° C. to 260° C.

While the alloy compositions may be produced by a variety of processes using different sequences of melt and dry blending for making the compositions, in one option the overall process may comprises the steps of:

A) melt blending to prepare a homogeneous blend composition of from 20 to 80% by weight based on the polymeric content of impact modifier of an ethylene interpolymer grafted with acid functionality having a Melt Index of from 0.5 to 100 prior to being grafted, from 80 to 20% by weight of an ungrafted diene interpolymer and a curative at a temperature below that at which the curative action is triggered, B) melt blending the homogeneous blend composition with up to 50% by weight of a condensation polymer having polar groups under conditions such that the temperature at which the curative action is triggered is exceeded and a phase inversion occurs in which the condensation polymer becomes the matrix component; and C) recovering the resulting thermoplastic alloy.

The grafted and ungrafted polymers for this and other process options may be blended batch-wise, for example in a Banbury, or continuously on an extruder to provide a masterbatch or the ungrafted product may be blended in a final section of a continuous extruder. The grafted and ungrafted components should be sufficiently compatible to provide a homogeneous mixture. The mixing temperature has to be maintained below the decomposition temperature of the peroxide in order to avoid premature cross-linking of the blend of grafted and ungrafted polymers.

The pre-blended modifier for this and other process options may be admixed with the polyamide batch-wise, such as in a Banbury, or in a continuous extruder-mixer under conditions where dynamic vulcanization can take place coincident with a phase inversion whereby the cured materials become progressively dispersed in the uncured polyamide matrix. Typical blending temperatures would go from 170° C. to 300° C. depending on the melting temperature of the polyamide used.

Other process options for preparing the alloys of the invention may include dry or melt-blending steps for introducing the various components into the alloy.

The curing is designed to maximize the cross-link density by appropriate selection of the curing system, which is preferably a peroxide curing system and the use of more reactive dienes such as vinyl norbornene. Co-agents such as EDMA (ethylene glycol dimethylacrylate), BDMA (butanediol dimethylacrylate), TMPT (trimethylpropan-trimethylacrylate), TRIM (trimethylol propane trimethacrylate), TAC (triallyl cyanurate) and others can also be used to increase the cross-link density of the dispersed phase.

The cross-linking agent is a peroxide optionally in conjunction with a co-agent or a phenolic resin. U.S. Pat. No. 4,311,628 which describes a phenolic curative system is incorporated herein for US purposes.

All of the optional and preferred aspects of the invention recited in connection with the modifier and alloy compositions of the invention are of course equally applicable singly and in combination to the process and use of the invention. The composition may be used to produce finished through molding process such as thermoforming, injection molding, rotomolding, compression molding, transfer molding or an extrusion process or blow molding process. Articles may be made for automotive applications such as a molded or extruded portion of a recyclable radiator hose or an air duct. Using the invention that the blending temperature may be increased up to above 230 up to 260° C. and screw speed above 100 rpm up to 150 rpm Optimal morphology, they are generally mixed with polyamide-6 at the lowest temperature possible (230° C.) and low screw speed (100 rpm).

EXAMPLES

The following polymeric ingredients were used:
A) MAH-g-EO is a maleated 0.882 density ethylene octene copolymer having an MFR (230° C., 10 kg) of 20 and a maleic anhydride content of 2.4%;
B) MAH-g-EPDM is a maleated EPDM containing 55.5 wt % ethylene and 3.8 wt % of ENB and having a final MFR (230° C., 10 kg) of 20 and a maleic anhydride content of 0.7 wt %:
C) MAH-g-EP is a maleated EPM containing 65 wt % of ethylene and having a final MFR (230° C., 2.16 kg) of 6 and a maleic anhydride content of 1.9 wt %.
D) EPDM is a terpolymer containing 55.5 wt % of ethylene, 44.5 wt % of propylene a Mooney [ML(1+4), 125° C.] of 25 and an ENB content of 3.8 wt % based on the combined ethylene and propylene weight.
E) EP-VNB is a terpolymer containing 77 wt % of ethylene, 23 wt % of propylene and 0.9 wt % of VNB.
F) EO is a 0.882 density ethylene octene copolymer having a MI (190° C., 2.16 kg) of 10 g/10 min.
G) Ultramid B3™ is a polyamide 6 having a MVR (230° C.) of 130 cc/10 min manufactured by BASF The following additives were used:
H) 2,5-dimethyl-2,5-di(tert-butylperoxy)-hexyne-(3) as the peroxide The blends for the modifier component of grafted interpolymer with the non grafted polymer and the peroxide were produced on a 1 liter Banbury mixer using following mixing cycle. 500 grams of polymer is added to the mixer followed by the peroxide and than the remaining polymer (500 grams) and after 1 minute the ram was pushed down and the mixing continued for another 3 minutes; when the temperature reaches 110° C. to 120° C., the masterbatch is discharged. The rotor speed was set at 77 rpm. The polymer mass is than granulated to provide a free flowing polymer.

The pre-blended modifier masterbatch was then blended with polyamide under following conditions to form the alloy: the masterbatch of maleic anhydride grafted ethylene copolymer and the non grafted polymer and the peroxide was fed to a 34 mm, 36 L/D co-rotating intermeshing twin screw extruder to be blended in a 70/30 ratio with Ultramid B3 under the following conditions: feed rate of 5 kg per hour with a 100 rpm screw speed and a temperature profile of approximately 230° C., 230° C., 230° C., 210° C., 210° C., 210° C., 210° C., 210° C., 260° C., 260° C. Strand cutting was used as a finishing operation. At some stage of the mixing operation, the peroxide is triggered and starts to cross-link the majority of the modifier component. As a result the modifier starts to form dispersed particles in a matrix of the polyamide, undergoing phase inversion so that the polyamide becomes the matrix component.

Prior to performing any experiments, all the pellets were dried at 85° C. for 8 hours in a dry air oven prior to injection molding. Testing plates of 100 mm×100 mm×2.6 mm were produced on a 30 tons injection molding machine with nozzle, front, rear and mold temperatures of 245° C., 255° C., 265° C., 260° C. and 65° C. respectively.

Dumbbell samples for tensile strength testing and bars for testing of the flexural modulus were cut in the direction across the flow. The samples were conditioned at 23° C. and 50% relative humidity for three days prior to testing. Tensile strength data was generated on 5A dumbbells at a speed of 200 mm/min according to ISO527-A. Flexural Modulus data were generated according to ISO 178 with test bars of 52 mm×25 mm×2.6 mm at a 1 mm/min speed and a 42 mm span. Hardness was tested according to ASTM D2240. The oil aging was performed according to VW norm TL523 61 with an engine oil C.20 SAE 5W-40 as described in TL 521 85.

TABLE 1

|  | 1 | 2 | 3 | 4 | 5 | 6 | 7 | 8 | 9 |
|---|---|---|---|---|---|---|---|---|---|
| Polyamide-6 | 30 | 30 | 30 | 30 | 30 | 30 | 40 | 40 | 40 |
| MA-g-EO | 70 |  |  |  |  |  | 60 |  |  |
| MA-g-EPDM |  | 70 |  |  |  |  |  | 60 |  |
| #1 MA-g-EO + 0.5% PO |  |  | 70 |  |  |  |  |  | 60 |
| #2 MA-g-EPDM + 0.5% PO |  |  |  | 70 |  |  |  |  |  |
| #3 75 MA-g-EO + 25 EPDM + 0.5% PO |  |  |  |  | 70 |  |  |  |  |
| #4 50 MA-g-EO + 50 EPDM + 0.5% PO |  |  |  |  |  | 70 |  |  |  |
| Tensile at break (MPa) | 10.6 | 1.9 | 13.8 | 9.1 | 12.3 | 13.6 | 15.1 | 4.5 | 17.9 |
| Mod 10% | 3.4 | 0.6 | 3.7 | 5.4 | 4.6 | 7.2 | 4.6 | 1.9 | 8.9 |
| Mod 20% | 4.4 | 0.9 | 4.9 | 6.2 | 5.9 | 8.2 | 5.9 | 2.8 | 10.5 |
| Mod 30% | 4.8 | 1.1 | 5.6 | 6.7 | 6.5 | 8.7 | 6.6 | 3.3 | 11.4 |
| Mod 50% | 5.3 | 1.4 | 6.6 | 7.5 | 7.5 | 9.5 | 7.6 | 4.1 | 12.6 |
| Mod 100% | 6.3 | 1.8 | 8.9 | 8.7 | 9.3 | 10.8 | 9.9 |  | 14.7 |
| Mod 200% | 8.7 |  | 12.8 |  | 11.7 |  | 13.9 |  | 17.4 |
| Elongation at break (%) | 290 | 175 | 240 | NA | 245 | NA | 260 | 80 | NA |
| Hardness Shore A | 90 | 45 | 92 | 93 | 92 | 95 | 93 | 78 | 96 |

TABLE 1-continued

|  | 1 | 2 | 3 | 4 | 5 | 6 | 7 | 8 | 9 |
|---|---|---|---|---|---|---|---|---|---|
| Flex Modulus (MPa) | 45 | 8 | 59 | 94 | 59 | 125 | 75 | 18 | 155 |
| % change after 7 days in oil |  |  |  |  |  |  |  |  |  |
| Tensile |  |  |  |  |  |  |  | −51 | −50 |
| Elongation at break |  |  |  |  |  |  |  | −48 | −85 |
| Weight % |  |  |  |  |  |  |  | 91 | 47 |

TABLE 2

|  | 10 | 11 | 12 | 13 | 14 | 15 | 16 | 17 | 18 |
|---|---|---|---|---|---|---|---|---|---|
| Polyamide-6 | 40 | 40 | 40 | 40 | 40 | 40 | 40 | 40 | 40 |
| #2 MA-g-EPDM + 0.5% PO | 60 |  |  |  |  |  |  |  |  |
| #3 75 MA-g-EO + 25 EPDM + 0.5% PO |  | 60 |  |  |  |  |  |  |  |
| #4 50 MA-g-EO + 50 EPDM + 0.5% PO |  |  | 60 |  |  |  |  |  |  |
| #5 50 MA-g-EO + 50 EP-VNB |  |  |  | 60 |  |  |  |  |  |
| #6 50 MA-g-EO + 50 EP-VNB + 0.25% PO |  |  |  |  | 60 |  |  |  |  |
| #7 50 MA-g-EO + 50 EP-VNB + 0.5% PO |  |  |  |  |  | 60 |  |  |  |
| #8 25 MA-g-EO + 75 EPDM |  |  |  |  |  |  | 60 |  |  |
| #9 25 MA-g-EO + 75 EPDM + 0.5% PO |  |  |  |  |  |  |  | 60 |  |
| #10 50 MA-g-EP + 50 EPDM + 0.5% PO |  |  |  |  |  |  |  |  | 60 |
| Tensile at break (MPa) | 13 | 24 | 18.4 | 8.4 | 15.5 | 20 | 2.7 | 15.2 | 15.2 |
| Mod 10% | 9 | 12.4 | 10.3 | 3.3 | 9.2 | 12.7 | 1.6 | 10 | 9.8 |
| Mod 20% | 9.8 | 13.4 | 11.3 | 4.2 | 10.7 | 13.7 | 2.2 | 10.8 | 10.7 |
| Mod 30% | 10.3 | 14 | 11.9 | 4.7 | 11.6 | 14.3 | 2.4 | 11.4 | 11.3 |
| Mod 50% | 11 | 14.8 | 12.7 | 5.2 | 12.6 | 14.9 | 2.6 | 12 | 12 |
| Mod 100% | 12.2 | 16.1 | 13.9 | 6.2 | 14.4 | 15.9 | 2.5 | 13 | 13.3 |
| Mod 200% |  | 18.7 | 16.2 | 8.3 |  | 18.3 |  | 15.2 |  |
| Mod 300% |  | 22.8 |  |  |  |  |  |  |  |
| Elongation at break (%) |  | 320 | 262 | 212 | 146 | 225 | 118 | 200 | 190 |
| Hardness Shore A | 96 | 97 | 96 | 90 | 95 | 97 | 76 | 96 | 95 |
| Flex Modulus (MPa) | 192 | 264 | 220 | 55 | 171 | 271 | 69 | 211 | 216 |
| % change after 7 days in oil |  |  |  |  |  |  |  |  |  |
| Tensile | −9 | −12 |  |  | −29 | 7 |  | −2 | −1 |
| Elongation at break | −52 | −47 |  |  | −70 | −13 |  | −23 | −35 |
| Weights | 9 | 8 |  |  | 44 | 6 |  | 9 | 11 |

Examples 10, 13, 14, and 16 combined a high tensile with high elongation and excellent performance retention upon aging.

Examples 19, 20 and 21 in Table 3 below show that the good performance is obtainable by combining the 3 components (the maleated modifier, the ungrafted diene interpolymer and the peroxide) in different ways with the polyamide. Example 19 describes the addition of the homogeneous blend of the 3 components. Example 20 illustrates the addition of a dry blend of the 3 components whereas example 21 illustrates the addition of the maleated modifier together with an homogeneous blend of the EPDM and the peroxide. Example 22 illustrates the addition of a dry blend containing a homogeneous blend of the maleated modifier with EPDM and a peroxide masterbatch:

TABLE 3

|  | 19 | 20 | 21 | 22 |
|---|---|---|---|---|
| Polyamide-6 | 40 | 40 | 40 | 40 |
| MA-g-EO |  | 28.75 | 29.75 |  |
| EPDM |  | 28.75 |  |  |
| #5 50 MA-g-EO + 50 EPDM + 0.5% PO | 60 |  |  |  |
| #11 40 EO + 40 EPDM + 20 PO |  |  | 2.5 |  |
| #12 99% EPDM + 1% PO |  |  |  | 30.25 |
| #13 47.5% MA-g-EO + 47.5% EPDM |  |  |  | 58.2 |
| #14 80% EO + 20% PO |  |  | 1.8 |  |
| Physical Properties |  |  |  |  |
| Tensile at Break [MPa] | 17.7 | 15.4 | 15.6 | 15.2 |
| Mod 10% [MPa] | 11 | 11.3 | 10.9 | 10.6 |
| Mod 20% [MPa] | 12 | 12.5 | 12.1 | 11.6 |
| Mod 30% [MPa] | 12.5 | 13.1 | 12.8 | 12.2 |
| Mod 50% [MPa] | 13.2 | 13.9 | 13.7 | 13.1 |
| Mod 100% [MPa] | 14.2 | 15 | 15.1 | 14.5 |
| Mod 200% [MPa] | 16.3 |  |  |  |
| Mod 300% [MPa] |  |  |  |  |
| Elongation at break [%] | 252 | 127 | 132 | 136 |
| Flexural Modulus MPa | 260 | 272 | 252 | 258 |
| Shore A Hardness | 98 | 98 | 98 | 68 |

TABLE 4

|  | 19 | 23 | 24 |
|---|---|---|---|
| Polyamide-6 | 40 | 40 | 40 |
| #5 50 MA-g-EO + 50 EPDM + 0.5% PO | 60 | 60 | 60 |
| Process Conditions |  |  |  |
| Temperature (zone 1 to 3) | 230° C. | 245° C. | 260° C. |
| Temperature (zone 4 to 10) | 210° C. | 245° C. | 260° C. |
| Physical Properties |  |  |  |
| Tensile at Break [MPa] | 17.7 | 15.5 | 15.3 |
| Mod 10% [MPa] | 11 | 10.6 | 11 |
| Mod 20% [MPa] | 12 | 11.6 | 11.9 |
| Mod 30% [MPa] | 12.5 | 12.1 | 12.4 |
| Mod 50% [MPa] | 13.2 | 12.7 | 13 |
| Mod 100% [MPa] | 14.2 | 13.6 | 14 |

TABLE 4-continued

|  | 19 | 23 | 24 |
|---|---|---|---|
| Mod 200% [MPa] |  | 16.3 | 15.2 |
| Mod 300% [MPa] |  |  |  |
| Elongation at break [%] | 252 | 210 | 185 |
| Flexural Modulus Mpa | 260 | 287 | 281 |
| Shore A Hardness | 98 | 98 | 98 |

Examples in table 4 show that the different mixing temperatures give good results.

The invention claimed is:

1. A thermoplastic alloy comprising:
(a) from 20 to 40 wt % of the total polymer weight of polymer of a condensation polymer having polar groups; and
(b) up to 80 wt % of a crosslinked dispersed elastomeric modifier comprising:
(i) from 40 to 80% by weight of a first interpolymer of ethylene and an alpha-olefin having from 4 to 12 carbon atoms grafted with from 0.1 to 4 wt % of an acid functionality; wherein the first interpolymer is obtained from a process using a metallocene based catalyst, and has:
a Melt Index, as measured according to ASTM 1238D, of from 0.3 g/10 min to 100 g/10 min,
a molecular weight distribution (Mw/Mn) of 3.5 or less, and
a density of from at least 0.85 g/cm$^3$ to less than 0.89 g/cm$^3$ prior to being grafted; and
(ii) from 60 to 20% by weight of an ungrafted diene containing interpolymer derived from ethylene and an alpha-olefin having from 3 to 12 carbon atoms;
wherein the thermoplastic alloy has a flexural modulus of from 100 MPa to 700 MPa and wherein the thermoplastic alloy has weight increase after oil aging at 100° C. of less than 25%.

2. The alloy of claim 1, wherein the flexural modulus is at least 150 MPa and less than 500 MPa.

3. The alloy of claim 1, wherein the thermoplastic alloy has a tensile strength corresponding to the equation A/B>35 MPa, where A is the tensile strength at break and B is the fraction by weight of the condensation polymer relative to the total polymer weight in the alloy.

4. The alloy of claim 1, wherein the condensation polymer is a polyamide having polar amide groups.

5. The alloy of claim 1, wherein the first interpolymer is a copolymer of ethylene and an alpha olefin having from 4 to 10 carbon atoms and contains from 0.1 to 4 wt % of maleic anhydride.

6. The alloy of claim 1, wherein the ungrafted diene containing interpolymer has a molecular weight expressed as a Mooney viscosity [ML(1+4) 125° C.] of from 10 to 100 and comprises 0.1 to 3 wt % of 5-vinyl-2-norbornene (VNB) derived units.

7. A thermoplastic alloy comprising:
a) from 20 to 40 wt % of the total polymer weight of a polyamide condensation polymer; and
b) up to 80 wt % of a crosslinked dispersed elastomeric modifier comprising:
(i) from 40 to 80% by weight based on the modifier of a interpolymer grafted with maleic anhydride and obtained from a process using a metallocene based catalyst, of ethylene and 1-butene, 1-hexane or 1-octene having a Melt Index of from 0.3 to 100, a molecular weight distribution (Mw/Mn) of 3.5 or less, and a density of from at least 0.85 to less than 0.89 g/cm$^3$ prior to being grafted; and
(ii) from 20 to 60% by weight of ungrafted 5-vinyl-2-norbornene (VNB) containing interpolymer derived from 65 to 85 wt % of ethylene derived units and alpha olefin derived units having from 3 to 12 carbon atoms;
wherein the thermoplastic alloy has a flexural modulus of from 100 MPa to 700 MPa and wherein the thermoplastic alloy has weight increase after oil aging at 100° C. of less than 25%.

8. The alloy of claim 7, wherein the flexural modulus is at least 150 MPa and the thermoplastic alloy further has a tensile strength corresponding to the equation A/B>40 MPa, where A is the tensile strength at break and B is the fraction by weight of the condensation polymer relative to the total polymer weight in the alloy.

9. The alloy of claim 1, wherein the condensation polymer contains at least 50 wt % based on the weight of the condensation polymer of a filler selected from the group consisting of glass beads, glass fibers, mineral fillers and combinations thereof.

10. A recyclable radiator hose or air duct having a molded portion formed by an alloy according to claim 1.

11. A recyclable radiator hose or air duct having a molded portion formed by an alloy according to claim 7.

12. The alloy of claim 7, wherein the condensation polymer contains at least 50 wt % based on the weight of the condensation polymer of a filler selected from the group consisting of glass beads, glass fibers, mineral fillers and combinations thereof.

13. The modifier of claim 7, where the interpolymer grafted with maleic anhydride has a molecular weight distribution of less than 2.

14. The alloy of claim 1, where said crosslinked dispersed elastomeric modifier is dispersed in a matrix of the condensation polymer by dynamic vulcanization.

15. The alloy of claim 7, where said crosslinked dispersed elastomeric modifier is dispersed in a matrix of the condensation polymer by dynamic vulcanization.

* * * * *